United States Patent [19]

Wahli

[11] Patent Number: 4,633,592
[45] Date of Patent: Jan. 6, 1987

[54] PRECISION RULE

[76] Inventor: Marcel Wahli, Allmendstrasse 3, CH-8154 Oberglatt, Switzerland

[21] Appl. No.: 730,720

[22] Filed: May 3, 1985

[30] Foreign Application Priority Data

May 15, 1984 [CH] Switzerland .................. 2382/84

[51] Int. Cl.⁴ .................................................. B43L 7/00
[52] U.S. Cl. ...................................... 33/493; 33/125 T; 33/403
[58] Field of Search ............... 33/493, 483, 484, 492, 33/491, 125 R, 125 T, 444, 436, 448, 449, 486, 403

[56] References Cited

U.S. PATENT DOCUMENTS

| | | | |
|---|---|---|---|
| 261,729 | 7/1882 | Knox | 33/492 |
| 1,984,273 | 12/1934 | Kuechenmeister | 33/492 |
| 2,509,559 | 5/1950 | Cardinell | 33/492 |
| 3,106,783 | 10/1963 | Justis | 33/444 |

FOREIGN PATENT DOCUMENTS

| | | | |
|---|---|---|---|
| 983141 | 6/1951 | France | 33/403 |
| 366978 | 3/1963 | Switzerland | 33/491 |

*Primary Examiner*—Willis Little
*Attorney, Agent, or Firm*—Flynn, Thiel, Boutell & Tanis

[57] ABSTRACT

A precision rule having a handle part, preferably of aluminum, a holding part, preferably of a hardened steel and a rail embedded in a longitudinal groove of the holding part having a measuring edge, preferably of a hard metal. The handle part and the holding part are connected to one another by the interpositioning of O-rings and screws such that a space which forms a temperature barrier is created. The screw shanks extend loosely in the handle part. With this form of precision rule, any heat influence on the measuring edge through unavoidable external heat sources, for example the heat of hands, is avoided even during longer working times, and is achieved by the provision of built-in heat barriers.

7 Claims, 3 Drawing Figures

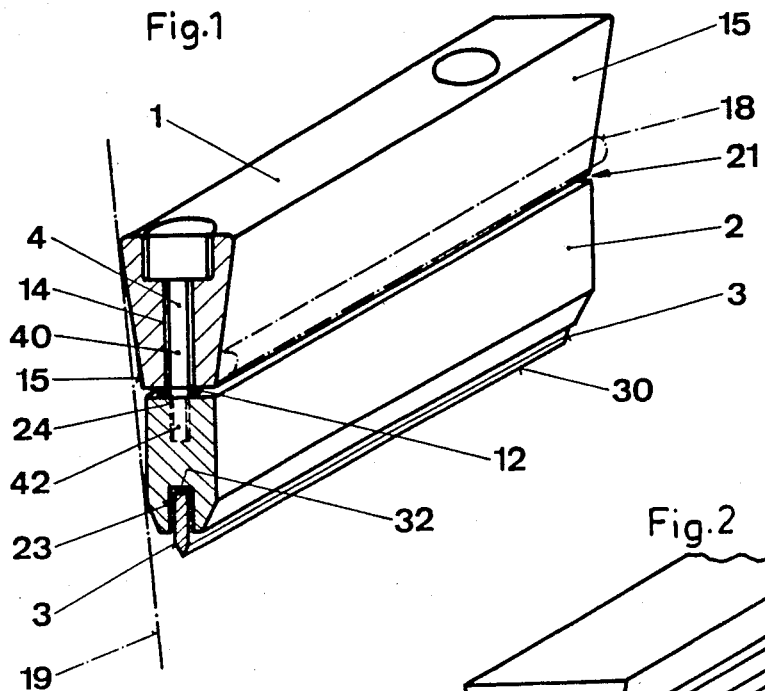
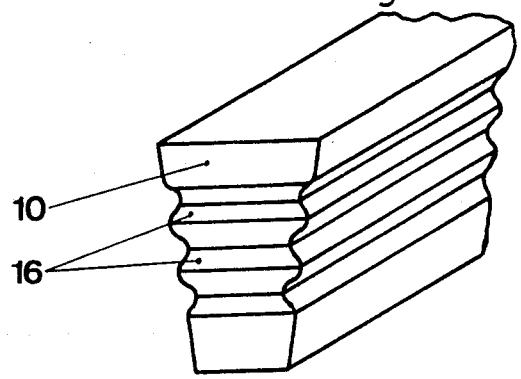
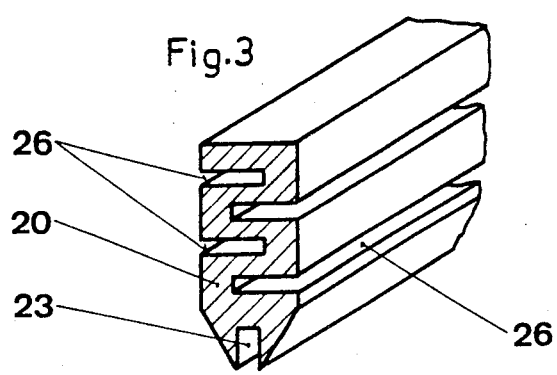

PRECISION RULE

FIELD OF THE INVENTION

The invention relates to a precision rule.

BACKGROUND OF THE INVENTION

Precision rules of hardened steel and a knifelike edge or of glass with a semicylindrically rounded edge of approximately 0.2 mm. radius are known. They are used as auxiliary means for comparison measurements in mechanical machine shops and in making tools. To test the straightness of an edge or the flatness of a surface, the precision rule is placed and/or moved on a workpiece, whereby the gap which is visible between the edge and the workpiece allows light to shine therethrough to result in the measurement of the straightness or the flatness.

Already at small temperature variations, in particular triggered by the heat of the hands during working, the measuring edge deforms and inexactnesses in measurements result. To eliminate this or to at least delay this, such apparatus are made of a profiled rod, for example a five-sided, prismatic rod, of a hardened steel. Due to the demand for a stable form, the precision rule must have a relatively large cross section, which makes it heavy and difficult to handle, which results during the checking of larger workpieces in a quick fatiguing by the user. Furthermore, the workpiece which is to be measured can deform due to the weight of the precision rule which is placed on the workpiece.

Already the thermal process for the hardening of the steel leads to stresses in the precision rule which, during a later contact and therefrom the resulting heating up in certain locations can lead to additional deformation of the measuring edge. Further, different stresses result during the use of the precision rule in that same is held on the one side only by the thumb and on the other side, however, by four fingers, which results in a different heat effect. In addition, since hardened steel is a poor heat conductor, a localized heat accumulation can occur whereat the fingers and thumb engage.

All of the aforementioned irregularly distributed stress zones have a negative effect on the relatively thin measuring edge which, during comparison measuring, is the only active one and there exists the possibility of an error. The measuring process must be interrupted.

In order to avoid these heat influences, it has been suggested to provide the handle portion on the area of the precision rule remote from the measuring edge, with plastic or wooden bars functioning as a handle surface. These bars delay the heat flow, however, do not prevent it. In wooden handles there exists the danger of absorbing moisture, which in turn leads to one-sided stress.

The purpose of the invention is to provide a precision rule which is light in weight, which is stable and which, during normal use, is not exposed to any thermal stresses.

This is inventively attained by a precision rule having a handle part and a measuring block which are connected by structure which permits minimal reciprocal movements and make a heat transfer more difficult.

The measuring edge remains practically uninfluenced by the stresses which occur in the handle part due to heat and due to the expansionlike separation of the handle part and the measuring part. In addition, there exists the possibility to manufacture the handle part of a lighter and possibly less expensive material than the measuring part. The measuring edge of the measuring part can be replaced and can preferably be manufactured of a more expensive material.

BRIEF DESCRIPTION OF THE DRAWINGS

Various modified embodiments of precision rules are illustrated in the drawing, in which:

FIG. 1 is a perspective view of a precision rule embodying the invention;

FIG. 2 illustrates a modified embodiment of the handle part; and

FIG. 3 illustrates a modified embodiment of the measuring member on which the measuring edge is mounted.

DETAILED DESCRIPTION

The precision rule consists of a handle part 1 and a holding part 2 for a rail 3 having a measuring edge 30.

The handle part 1 is of a prismatic form and consists preferably of aluminum. It is connected to the holding part 2 by screws 4. The screw shanks 40 extend through holes 14 in the handle part 1, which holes are larger in diameter than the diameter of the shanks of the screws. The threaded part 42 of the screws 4 are screwed fixedly into the tapped holes 24 in the holding part 2 so that a space 21 is formed between the handle part 1 and the holding part 2. Between the handle part 1 and the holding part 2 there is arranged an O-ring 12 which encircles a screw 4, which together results in a rigid to slightly elastic connection of the handle part and the holding part.

The holding part 2 can consist of any material, for example steel, ceramic or the like, which is stable with respect to shape and is temperature resistant. The rail 3, which forms the actual core piece of the precision rule, with the meaasuring edge 30 can consist of an expensive material, for example hard metal, special glass or the like. The rail is embedded in and held in a longitudinal groove 23 of the holding part by a rigid or slightly elastic adhesive material 32, for example glue, cement or the like.

The side surfaces 15 of the handle part 1, which side surfaces extend conically in toward the measuring edge and serve to hold the precision rule during its use, can be grooved or can be coated with a protective layer so that heat which is transmitted onto the handle part can cause an expansion of the handle part 1, however, a heat transfer takes place neither onto the holding part 2, nor onto the rail 3 and measuring edge 30. The space 21, O-rings 12 and the connecting material 32 serve as a protection against heat flow, that is as a temperature barrier. One could view the screws 4 as a single heat bridge, however, the screws are spaced inwardly from the internal surfaces of the holes 14. A fixed connection is represented only by the undersides of the screw heads. The provision of clearance between the screws 4 and the handle part 1 permits, due to heat, a certain amount of relative movement between the handle part 1 and the rigid fixing of the threaded parts 42 of the screws to the holding part 2.

In the case of damage to the measuring edge 30, either the rail 3 extending in the longitudinal groove 23 of the holding part 2 can be replaced or the holding part 2 can be replaced or, for a reworking, can be disassembled by a few manipulations. It is also possible to connect a different measuring part having a longer measuring edge, to the handle part.

FIG. 1 indicates by the reference numeral 19 a surface, on which the precision rule can be placed during nonuse without any danger of damage or heat influence. The profile forms of the handle part 1 and holding part 2 are chosen so that the measuring edge 30 does not come into contact with the surface 19.

A collar 18 can be arranged on the handle part 1 near and along the space 21 and serves as a temperature barrier, which collar 18, during a holding of the precision rule, prevents a contact of the holding parts by the fingers and thus prevents the fingers from a direct heat transfer to the holding part.

With reference to the selection of the base material of the individual parts, both the holding part 2 and also the rail 3 consist preferably of a material having similar heat-expansion coefficients, in particular since aside from the heat of the hand also the environmental heat and the heat of the breath can influence the precision of the measurement. A handle part of aluminum or plastic assures a significantly lower weight of the precision rule and the described design assures the same or better stability than the one of common precision rules.

FIG. 2 illustrates a modified embodiment of a handle part 10 having side surfaces which are provided with ribs 16, which results in a good handling capability and, furthermore, the fingers do not fully rest on the entirety of the surfaces.

FIG. 3 illustrates a modified embodiment of a holding part 20, without the inserted measuring rail. By the alternate arrangement of longitudinal slots 26, the heat passage from the handle part to the measuring edge is made additionally more difficult. The meanderlike heat flow can easily be recognized on the sectioned face which is illustrated in FIG. 3. The longitudinally extending slots 26 assure an enlargement of the heat-radiation surface without losing the stability of the precision rule.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A precision rule, comprising a handle part, a holding part having a measuring edge, and connecting means for connecting said holding part to said handle part, said connecting means providing a free space between said handle part and said holding part as well as providing a temperature barrier, and including an elastically yieldable, heat insulating spacer means in said space for facilitating only a minimal amount of relative movement between said handle part and said holding part while simultaneously blocking heat flow therethrough, only said connecting means extending through said space to provide said connection of said handle part and said holding part to thereby substantially restrict the heat transfer from said handle part to said holding part.

2. A precision rule according to claim 1, wherein said connecting means for connecting said handle part and said holding part to one another includes plural screws extending through openings in said handle part.

3. A precision rule according to claim 1, wherein the shank portion of said screws is arranged with small clearance for movement in a hole in said handle part, a screw thread of said screw being fixedly received in a tapped hole of said holding part, wherein said elastically yieldable, heat insulating spacer means is an O-ring which encircles said shank portion in said free space.

4. A precision rule according to claim 1, wherein said holding part has longitudinal slots arranged on opposite sides thereof and extend parallel to said space.

5. A precision rule according to claim 1, wherein said handle part consists of a light weight material, wherein said holding part consists of a heavy material which has an independent stiffness characteristic, and wherein said rail having said measuring edge thereon consists of a hard material.

6. A precision rule according to claim 5, wherein the material of said holding part and the material of said rail have a similar heat-expansion coefficient.

7. A precision rule according to claim 1, wherein a longitudinal groove is provided in said holding part and receives therein a rail having said measuring edge thereon, wherein a collar extending along side of said space is provided and projects beyond side surfaces arranged on said handle part and said holding part, wherein a theoretical straight line contacting said side edges of said handle part, said holding part and an outer surface of said collar on said handle part does not contact said rail or said measuring edge thereon.

* * * * *